(12) United States Patent
Reichartz

(10) Patent No.: US 6,827,520 B2
(45) Date of Patent: Dec. 7, 2004

(54) CONNECTION SYSTEM FOR FIRMLY CONNECTING AT LEAST TWO ELEMENTS

(75) Inventor: Paul Reichartz, Korschenbroich (DE)

(73) Assignee: INDUO Gesellschaft zur Verwertung von Schutzrechten mbH & Co, KG, Korschenbroich (DE)

( * ) Notice: Subject to any disclaimer, the term of this patent is extended or adjusted under 35 U.S.C. 154(b) by 0 days.

(21) Appl. No.: 10/311,922
(22) PCT Filed: Jun. 16, 2001
(86) PCT No.: PCT/EP01/06827
§ 371 (c)(1), (2), (4) Date: Apr. 2, 2003
(87) PCT Pub. No.: WO01/98597
PCT Pub. Date: Dec. 27, 2001

(65) Prior Publication Data
US 2003/0167723 A1 Sep. 11, 2003

(30) Foreign Application Priority Data
Jun. 20, 2000 (DE) .......................... 100 29 343

(51) Int. Cl.[7] ................................. F16B 9/00
(52) U.S. Cl. .................... 403/192; 403/187; 52/127.12; 52/655.1
(58) Field of Search ................. 403/292, 298, 403/19, 187, 188, 189, 192, 197; 52/726.1, 655.1, 582.1, 583.1, 585.1, 127.7, 127.12

(56) References Cited
U.S. PATENT DOCUMENTS

| | | | | |
|---|---|---|---|---|
| 5,435,109 A | * | 7/1995 | Kim | 52/585.1 |
| 5,485,703 A | * | 1/1996 | Nordahl | 52/585.1 X |
| 5,634,312 A | * | 6/1997 | Tolliver et al. | 52/583.1 X |
| 6,256,960 B1 | * | 7/2001 | Babcock et al. | |
| 6,688,068 B2 | * | 2/2004 | Osterberg | 52/655.1 |

FOREIGN PATENT DOCUMENTS

| | | |
|---|---|---|
| DE | 9701458 | 9/1998 |
| EP | 0127095 | 12/1984 |
| EP | 0685609 | 6/1995 |

* cited by examiner

Primary Examiner—Daniel P. Stodola
Assistant Examiner—Ryan M. Flandro
(74) Attorney, Agent, or Firm—Sidley Austin Brown & Wood, LLP

(57) ABSTRACT

This invention relates to a joining system (1) for fixedly joining at least two elements (2, 3), in particular girders, comprising at least one first element (2) which is adjacent at one of its ends to the other element (3) on a contact surface (14) and is attached to this element with a joining means (11) and at least one connecting part (7), in particular a shear connector made of a high-strength material, preferably metal, which is connected to one of the elements (2), in particular by being integrated into it. To permit an improved possibility for fastening the two elements, it is provided according to this invention that the connecting part (7), in particular the shear connector, is provided with a continuous recess (9), in particular with a borehole, and the joining means (11) extends through the recess (9), whereby the element (2) receiving the connecting part (7) is designed as a wooden component.

23 Claims, 3 Drawing Sheets cONNECTION SYSTEM FOR FIRMLY
CONNECTING AT LEAST TWO ELEMENTS

TECHNICAL FIELD

This invention relates to a joining system for fixedly joining at least two elements, in particular beams and girders, comprising at least one first element which at one of its ends is adjacent to the other element on a contact face and is attached thereto by a joining means and at least one connection part, which is attached to one of the elements, in particular by being integrated into it, and is in particular a shear connector made of a high-strength material, preferably a metal.

STATE OF THE ART

A joining system of the generic type is known from German Patent DE 197 01 458 C1. The joining systems described there have proven especially suitable in wood construction. To ensure a stable joint, a supporting beam is divided—usually at the center—and a recess is cut into the interior of the beam. The cross-sectional contour of the recess corresponds to that of a metal shear connector, which is integrated into the beam. For the purpose of a secure hold, the shear connector is equipped with a plurality of mandrels which correspond to a complementary pattern of holes in the beam. Threaded boreholes are cut in the shear connector so that a connecting part can be attached fixedly by screws.

Joining systems of the type known previously, however, occasionally reach the limit of their assembly capacity. When space is limited, it may be difficult under some circumstances to manufacture the beam connector because there is not enough space and thus there is not enough accessibility to attach screws from the outside to a girder equipped with a shear connector.

EXPLANATION OF THE INVENTION

Therefore, the object of this invention is to improve upon a joining system of the generic type, to permit a simplified and inexpensive method of mounting beams equipped with a shear connector onto any connecting elements.

The method of achieving this object is characterized according to this invention in that the connecting part, in particular the shear connector, is provided with a continuous recess, in particular a borehole, and the joining means extend through the recess, whereby the element accommodating the connecting part is designed as a wooden component. Due to this design there are novel and advantageous possibilities for joining systems, as explained below.

The connecting part in the form of the shear connector, which was previously already known as such, has a plurality of projections, i.e., mandrels, for integrally anchoring in one of the elements. Frequently the element receiving the connecting part is designed as a beam. As is already known, the element accommodating the shear connector may be designed to be divisible for insertion of the shear connector, preferably divisible in its central plane. However, division in a plane in which the tensile or compressive zone of the beam is located is also possible; in this manner, the beam force is introduced into the shear connector in the best possible manner and transmitted by it.

According to one refinement of this invention, the joining means for attachment to the other element is equipped with an end section which cooperates with an opposing section in or on the other element in a form-fitting manner. This refers in particular to a spherical or hook-shaped end section of the joining means which cooperates with a suspension connection or a click connection in the other element.

It is preferably provided that the joining means is equipped with a threaded section with cooperates with a threaded borehole on or in the other element for fastening to the other element.

Preferably a screw, in particular a cap head screw with a hexagonal head (socket-head cap screw) is used as the joining means. The head of the screw then advantageously has a diameter greater than the diameter of the borehole created in the shear connector. In addition, the head of the screw may be arranged on the side of the shear connector facing away from the other element.

To accommodate the shear connector in the beam, according to a refinement of this invention, a recess running is cut along the longitudinal axis of the beam, preferably having a cross section in the shape of a diamond or a square, extending at least slightly beyond the length of the shear connector. In most cases however, the recess running along the longitudinal axis of the beam will extend over the entire length of the beam, which may be simpler from the standpoint of the manufacturing technology.

For mounting of the element, preferably a beam or girder, on the other element, it is preferable for it to have a recess on the side of the shear connector facing away from the other element, the longitudinal axis of this recess forming an angle with that of the element, preferably the beam, whereby the two recesses intersect. It is provided here to advantage that the angle amounts to between 20° and 60°, preferably between 30° and 50°.

Although a beam is preferably provided as the first element, this invention can equally be applied to any other elements to be joined, in particular flat or rod-shaped components such as boards.

After mounting, the opening formed at the surface of the beam by the recess arranged at an angle may be provided with a closure, in particular a stopper.

A further simplification of the assembly procedure is obtained when a securing element is arranged behind the screw as seen from the contact surface away in the beam, this securing element preventing displacement of the screw relative to the connecting part; the securing element is preferably a pin. It is advantageously arranged at a distance of 5 to 200 mm, preferably 75 to 125 mm, from the end of the screw in the mounted state.

The elements to be joined, in particular beams, may be made of wood, metal, especially steel, or steel-reinforced concrete. It is equally possible to establish a connection to and/or between masonry walls or masonry parts. In addition, one or both of the elements to be joined may be made of plastic. In other words, the joining system proposed here is suitable for a wide variety of applications, especially advantageously in wooden cross-beams in a wooden load-bearing system.

The especially advantageous applications of the joining system are in supporting frameworks and in trelliswork-style constructions as well as in furniture, especially in solid wooden furniture. It is also used to advantage in the manufacture of laminated board materials, preferably in boards composed of multiple layers of wood.

COMMERCIAL APPLICABILITY

The joining system proposed here permits construction of very simple and inexpensive joints, which can be used for wood-wood joints, wood-steel joints, wood-steel-reinforced concrete joints and wood-masonry joints, for example. This makes it possible to implement dense packings and/or arrangements of multiple beam elements.

It is very advantageous that no visible connections remain with any desired joints. The seal also yields an improved fire prevention effect to advantage.

The joining system according to this invention may also be used to implement and construct wooden structures of multiple floors, in particular two to three floors. This leads to new possibilities in wood construction.

With the joining system according to this invention it is possible to produce not only two connections but also several combined connections. This makes it possible to produce symmetrical or asymmetrical designs, in particular with any desired beam cross sections—namely it is possible to produce connections resembling node points in an especially simple manner, where symmetrical or eccentrically positioned elements come together.

BRIEF DESCRIPTION OF THE DRAWINGS

The drawing shows one exemplary embodiment of the invention, showing.

MEANS OF IMPLEMENTING THE INVENTION

Figure 1:
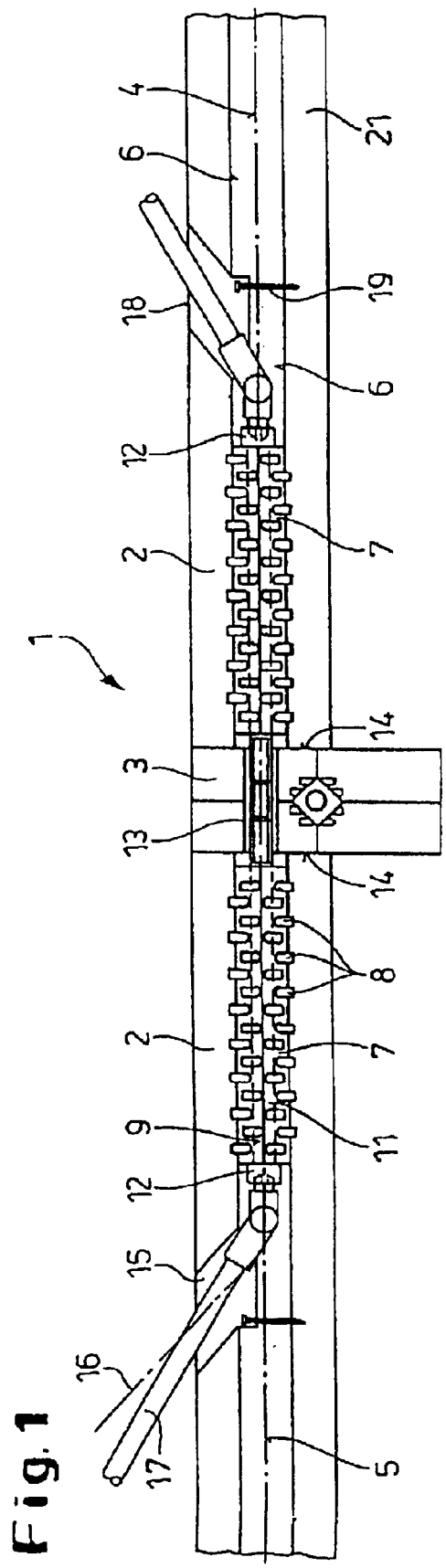
FIG. 1 schematically a section through a joining system consisting of two beams attached to a main girder.

FIG. 1 shows schematically a section through a joining system 1. Two beams 2—designed as secondary girders of a wooden construction—are attached to a main girder 3. For the purpose of establishing a stable connection between elements 2 and 3, beams 2 are designed as divided in the plane 4 of the greatest compressive and tensile stress. Recesses 6 having the shape of a diamond in cross section run along the longitudinal axis 5 of the beam 2 on both sides of the plane of division 4.

The recesses 6 are adapted to the basic shape of the shear connector 7, which is provided with mandrels 8, to find a secure hold in beam 2. Details of this design can be found in DE 197 01 458 C1.

The shear connector 7 is provided with a continuous borehole 9. The joining means 11 in the form of a socket-head cap screw may be passed through this borehole 9. The diameter of the borehole 9 in the shear connector 7 is smaller than the diameter of the screw head 12. Thus the shear connector 7—and thus also the beam 2—may be fixedly joined to the main girder 3 (into which a threaded sleeve 13 has been fixedly inserted) by tightening the screw 11. The head 12 of the socket-head cap screw 11 is thus arranged on the side of the shear connector 7 at a distance from the contact face 14 between the beam 2 and the main girder 3.

The following procedure is used for assembly of the beam 2 on the main girder 3:

Another recess 15 is situated behind the shear connector 7—as seen from the contact face 14—in addition to the recess 6 running longitudinally in the beam 2. Its axis 16 is arranged at an angle to the longitudinal axis 5 of the beam 2. The two recesses—recess 6 running longitudinally in the beam and recess 15 running at an angle to the former—intersect, providing access to the recess 6 from the outside. The angle at which the recess 15 runs to the longitudinal axis 5 preferably varies between 30° and 50°.

A suitable tool (e.g., an articulated wrench with a cardan shaft drive 17 or a flexible shaft) is inserted into recess 15 and also into recess 6, and the head 12 of the socket-head cap screw 11 is gripped and turned for the purpose of tightening the screw in the beam. The screw can be tightened with the desired torque. After tightening the screw 11, the opening 18 which creates the recess 15 on the outside of the beam, can be closed by a stopper (not shown); for example a wooden stopper which fits the recess exactly may be glued in place there.

In order for screw 11 not to be able to slip out of the shear connector 7 before assembly, a securing pin 19 is arranged at a slight distance behind the shear connector 7.

Figure 2:
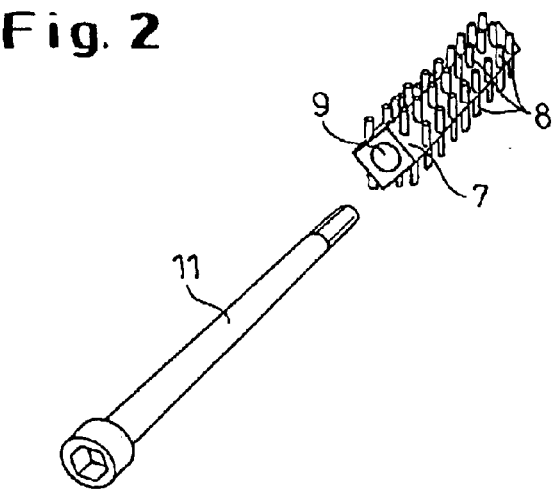
FIG. 2 a perspective view of the connection part and the joining means before assembly.

FIG. 2 shows in a prospective view the shear connector 7 with its mandrels 8. The shear connector 7 is designed as an elongated part through which borehole 9 passes. The socket-head cap screw 11 is illustrated before insertion into shear connector 7.

Figure 3:
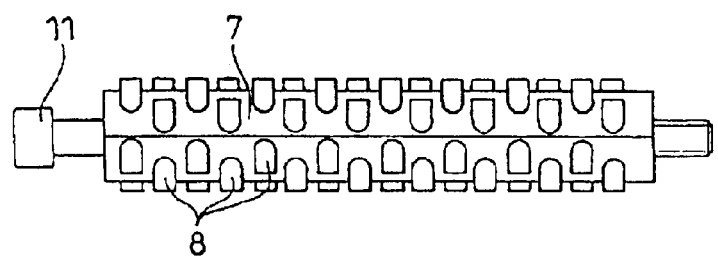
FIG. 3 connection point and joining means in the assembled state.

On the other hand, FIG. 3 shows a side view of the shear connector 7 with the screw 11 inserted.

Figure 4:
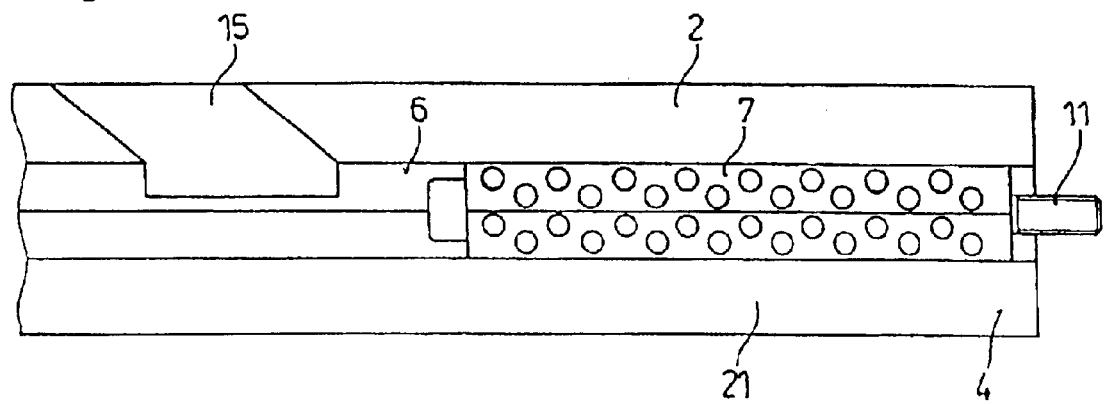
FIG. 4 a view of the connection part inserted into the beam together with the joining means.

FIG. 4 shows the bottom half 21 of the beam 2 which is divided at the plane of division 4. The shear connector 7 with the screw 11 passing through it has been inserted into recess 6 in the beam 2 running longitudinally. In addition, this also shows recess 15 running at an angle and intersecting recess 6.

Figure 5:
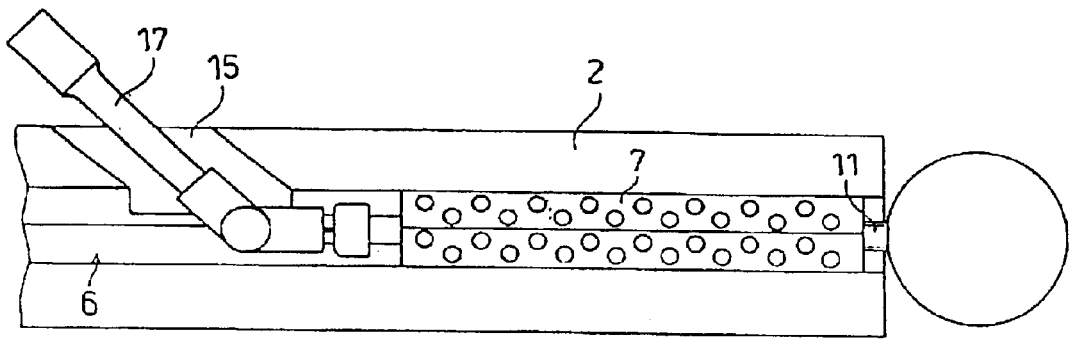
FIG. 5 the process of assembly of the beam on a second element.

FIG. 5 shows a similar structure, also showing how beam 2 is connected to a second element (spherical here) by the shear connector 7. Additional beams 2 may be screwed onto the spherical element to produce the node point of the framework.

Screw 11 is tightened by means of tool 17. Tool 17 extends from the recess 15 into recess 6 in which the shear connector 7 is arranged.

Figure 6:
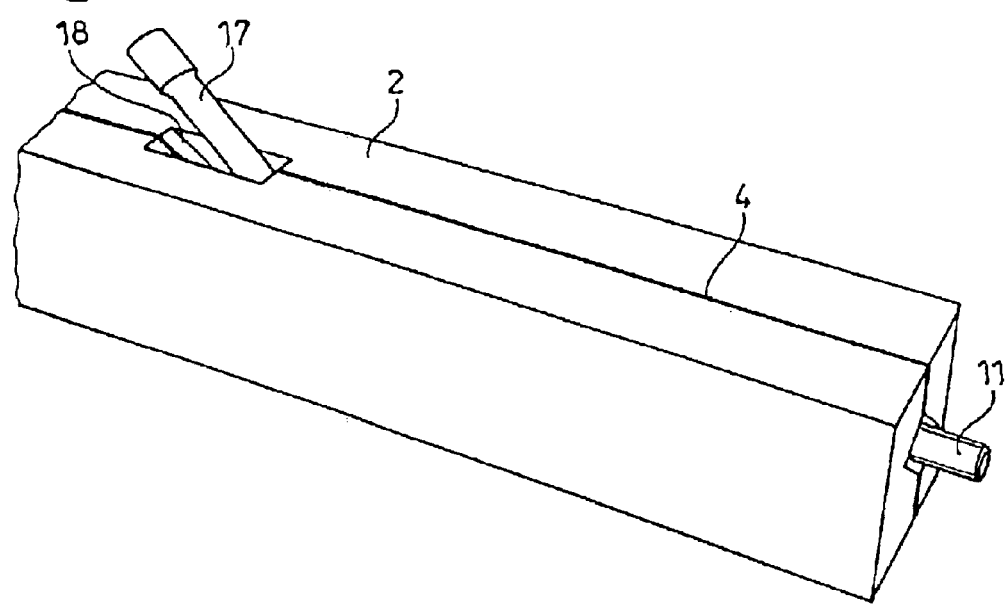
FIG. 6 a perspective view of the beam in the condition ready for assembly.

FIG. 6 shows a prospective diagram of beam 2 in the completely mounted state. Beam 2 is composed of its two halves, which are in contact at the joining plane 4. The tool 7 is inserted into the orifice 18 to be able to tighten the screw 11.

What is claimed is:

1. A joining system (1), comprising:
   at least one first element (2) formed as a beam made of a wooden material;
   a second element (3), at least one first element (2) having, at one of opposite ends thereof, a contact face (14) arranged adjacent to the second element (3);
   joining means (11) for joining the at least one first element (2) and the second element (3); and
   at least one connecting part formed as a shear connector (7) made of a high-strength material and connected with the at least one first element (2), the shear connector (7) having a continuous recess (9), and the joining means (11) extending through the continuous recess (9) and freely movable in a longitudinal direction,
   wherein the at least one first element (2) has a first recess (6) cut thereinto and extending along a longitudinal axis (5) thereof for receiving the shear connector (7), the first recess (6) having a cross-section of one of diamond and square and a length slightly exceeding a length of the shear connector (7), and wherein the at least one first element (2) has, at a side of the shear connector (7) remote from the second element (3), a second recess (15) a longitudinal axis (16) of which forms an angle with the longitudinal axis (5) of the at least one first element (2), so that the first and second recesses (6, 15) of the at least one first element (2) intersect.

2. The joining system according to claim 1, wherein the shear connector (7) is provided with a plurality of projections (8) formed as mandrels for integrally anchoring the shear connector in the at least one first element (2).

3. The joining system according to claim 1, wherein the at least one first element (2) is formed separable in a middle plane (4) thereof for introducing the shear connector (7).

4. The joining system according to claim 3, wherein the middle plane (4) is a plane in which a tensile or compressive zone of the at least one first element (2) is located.

5. The joining system according to claim 1, wherein the joining means (11) has an end section which cooperates in a form-fitting manner with a mating section of the second element (3) for fastening the joining means (11) to the second element (3).

6. A joining system according to claim 5, wherein the end section of the joining means (11) is formed as a threaded section, and the mating section of the second element (3) is formed as a threaded borehole.

7. The joining system according to claim 1, wherein the joining means (11) is formed as a screw.

8. The joining system according to claim 7, wherein the continuous recess (9) of the shear connector (7) is formed as a borehole, and the screw is a pan head screw with a hexagonal head (12) a diameter of which is greater than a diameter of the borehole.

9. The joining system according to claim 8, wherein the hexagonal head (12) is provided on the side of the shear connector (7) remote from the second element (3).

10. The joining system according to claim 1, wherein the first recess (6) of the at least one first element (2) extends over an entire length of the at least one first element (2).

11. The joining system according to claim 1, wherein the angle between the longitudinal axis (16) of the second recess (16) of the at least one first element (2) and the longitudinal axis (5) of the at least one first element (2) amounts to between 20° and 60°.

12. The joining system according to claim 1, wherein the angle amounts to between 30° and 50°.

13. The joining system according to claim 1, wherein an opening (18), which forms the second recess (15) of the at least one first element (2) is provided with a closure formed as a stopper.

14. The joining system according to claim 1, wherein the at least one first element (2) is made of wood.

15. A joining system according to claim 1, wherein at least one first element (2) is formed as one of board, laminated board, board layers, and combination thereof.

16. The joining system according to claim 1, wherein the second element (3) is made of metal.

17. The joining system according to claim 1, wherein the second element (3) is made of steel-reinforced concrete.

18. The joining system according to claim 1, wherein the second element (3) is made of masonry parts.

19. The joining system according to claim 1, wherein the at least one first element (2) is a cross-beam made of wood in a wooden supporting structure.

20. A joining system (1), comprising;

at least one first element (2) formed as a beam of a wooden material;

a second element (3), the at least one first element (2) having, at one of opposite ends thereof, a contact face (14) arranged adjacent to the second element (3);

joining means (11) for joining the at least one first element (2) and the second element (3);

at least one connecting part formed as a shear connector (7) made of a high-strength material and connected with the at least one first element (2), the shear connector (7) having a continuous recess (9), and the joining means (11) extending through the continuous recess (9) and freely movable in a longitudinal direction;

and a securing element (19) arranged in the first element (2) behind the joining means (11), as seen from the contact face (14), for preventing displacement of the joining means (11) relative to the connecting part.

21. The joining system according to claim 20, wherein the securing element (19) is a pin.

22. The joining system according to claim 20, wherein a distance between an end of the joining means (11) in a mounted state thereof and the securing element (19) is between 5 and 200 mm.

23. The joining system according to claim 22, wherein the distance is between 75 and 125 mm.

* * * * *